United States Patent
Igarashi et al.

(10) Patent No.: US 8,062,406 B2
(45) Date of Patent: Nov. 22, 2011

(54) PROCESS FOR PRODUCING METALLIC ULTRAFINE POWDER

(75) Inventors: Hiroshi Igarashi, Kai (JP); Takayuki Matsumura, Kai (JP); Shinichi Miyake, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 1128 days.

(21) Appl. No.: 11/793,424

(22) PCT Filed: Dec. 22, 2005

(86) PCT No.: PCT/JP2005/023618
§ 371 (c)(1),
(2), (4) Date: Jun. 20, 2007

(87) PCT Pub. No.: WO2006/068231
PCT Pub. Date: Jun. 29, 2006

(65) Prior Publication Data
US 2008/0145657 A1    Jun. 19, 2008

(30) Foreign Application Priority Data
Dec. 22, 2004  (JP) .................................. 2004-370893

(51) Int. Cl.
B22F 9/22 (2006.01)
(52) U.S. Cl. ........................................... 75/338; 75/369
(58) Field of Classification Search .................. None
See application file for complete search history.

(56) References Cited

U.S. PATENT DOCUMENTS

| | | | |
|---|---|---|---|
| 4,976,776 A * | 12/1990 | Elvander et al. | 75/483 |
| 5,852,768 A | 12/1998 | Jacobsen et al. | |
| 6,530,972 B2 * | 3/2003 | Akimoto et al. | 75/351 |
| 6,679,938 B1 * | 1/2004 | Kim et al. | 75/365 |
| 2002/0184969 A1 * | 12/2002 | Kodas et al. | 75/330 |
| 2002/0189401 A1 | 12/2002 | Takaya et al. | |
| 2004/0050207 A1 * | 3/2004 | Wooldridge et al. | 75/362 |
| 2008/0268246 A1 * | 10/2008 | Stark et al. | 428/402 |

FOREIGN PATENT DOCUMENTS

| | | |
|---|---|---|
| EP | 1 205 710 | 5/2002 |
| EP | 1 263 004 A | 12/2002 |
| JP | 56-149330 | 11/1981 |
| JP | 02-054705 | 2/1990 |

(Continued)

OTHER PUBLICATIONS

Mueller et al, "Nanoparticle Synthesis at High Production Rates by Flame Spray Pyrolysis", Chemical Engineering Science, vol. 58, No. 10, 2003, pp. 1969-1976; XP002538921.

(Continued)

Primary Examiner — George Wyszomierski
(74) Attorney, Agent, or Firm — Nixon & Vanderhye P.C.

(57) ABSTRACT

A process for producing metallic ultra-fine powder, which can use a raw material which is spread over a wide range, and control freely the grain size of the metallic powder to be produced, at low cost and high safety. The process for producing the metallic ultra fine powder consists of using a burner and a furnace which can generate a high temperature reductive atmosphere, and an apparatus for separating gas which is generated in the furnace from powder to recover the powder. The burner has a function of blowing a powdery metallic compound as a raw material into a high temperature reductive flame. The raw material powder is efficiently heated in airflow of a high temperature reductive flame, thereby being reduced rapidly into metallic ultra-fine powder. At this time, the grain size of the metallic ultra-fine powder is controlled by adjusting the oxygen ratio (i.e. the ratio of amount of the burning-assist gas supplied to the burner to the amount of the burning-assist gas required for completely burning the fuel).

7 Claims, 10 Drawing Sheets

FOREIGN PATENT DOCUMENTS

| | | |
|---|---|---|
| JP | 04-365806 | 12/1992 |
| JP | 2001-124307 | 5/2001 |
| JP | 2002-356708 | 12/2002 |
| JP | 2004-044907 | 2/2004 |
| KR | 2001-0100920 | 11/2001 |
| KR | 10-2004-0040833 | 5/2004 |

OTHER PUBLICATIONS

Strobel et al, "Flame-made Platinum/Alumina: Structural Properties and Catalytic Behaviour in Enantioselective Hydrogenation", Journal of Catalysts, vol. 213, No. 2, 2003, pp. 296-304; XP002538922.

Johannessen et al, "One-Step Flame Synthesis of an Active Pt/TiO2 Catalyst for SO2 Oxidation? A Possible Alternative to Traditional Methods for Parallel Screening", Journal of Catalysis, vol. 205, No. 2, 2002, pp. 404-408; XP002538923.

Hansen et al, "Synthesis of ZnO Particles in a Quench-Cooled Flame Reactor", Aiche Journal, vol. 47, No. 11, Nov. 2001, pp. 2413-2418; XP002538924.

International Search Report for PCT/JP2005/023618 mailed Apr. 4, 2006 (English and Japanese).

* cited by examiner

CORRELATION BETWEEN OXYGEN RATIO
AND METALLIZATION PERCENTAGE

PROCESS FOR PRODUCING METALLIC ULTRAFINE POWDER

This application is the U.S. national phase of International Application No. PCT/JP2005/023618 filed 22 Dec. 2005, which designated the U.S. and claims priority to JP 2004-370893 filed 22 Dec. 2004, the entire contents of each of which are hereby incorporated by reference.

TECHNICAL FIELD

The present invention relates to a process for producing metallic ultra-fine powder, for obtaining metallic ultra-fine powder having controlled grain size from a metallic compound in a high temperature reductive atmosphere using a burner, a burner for producing metallic ultra-fine powder, and an apparatus for producing metallic ultra-fine powder.

Priority is claimed on Japanese Patent Application No. 2004-370893, filed Dec. 22, 2004, the content of which is incorporated herein by reference.

BACKGROUND ART

In recent years, the needs to lower the grain size of metallic powders used in electronic parts are increasing with the advance of miniaturization of the electronic parts used in portable terminals, etc. Nickel ultra-fine powder used for laminated ceramic capacitors are exemplary. As a process for producing nickel ultra-fine powder, there is a method including the step of heating and evaporating a chloride raw material having a high vapor pressure within a CVD apparatus, and further supplying hydrogen gas as a reducing agent into the apparatus to reduce the raw material, thereby producing metallic nickel ultra-fine powder having a grain size of not larger than 1 μm.

Such a production method is recognized to be suitable for producing fine powder, because in the method the raw material is evaporated to be reduced and deposited at a relatively low temperature of approximately 1000° C. (i.e. not higher than the melting point of nickel). However, since such a method uses a CVD apparatus, it necessitates expensive electrical energy to heat the raw material, and since the method uses expensive hydrogen as a reductive gas, it is costly. Moreover, since the method is reductive reaction of a chloride by hydrogen, there is a problem that it necessitates costly equipment in which the possibility of corrosion, leaks and the like of the apparatus is properly addressed, because poisonous gases such as chloride gas and hydrogen chloride gas are generated in a furnace, as is disclosed in Patent Document 1 (Japanese Unexamined Patent Application, First Publication No. H04-365806).

On the other hand, there is a method for producing iron fine powder which includes burning a hydrogen-containing fuel with an oxygen-containing gas using a burner, and supplying vaporized iron chloride into the flame to cause high-temperature hydrolysis, thereby producing iron fine powder, as is disclosed in Patent Document 2 (Japanese Unexamined Patent Application, First Publication No. Showa 56-149330). This method is relatively low cost, because it does not use costly electrical energy to control the atmosphere of the reductive reaction field, and further it necessitates no hydrogen gas. However, similarly to the above method, it necessitates countermeasures against generation of chloride gas and hydrogen chloride, because the method uses chloride as a raw material. Moreover, the metallic powders which are produced have a grain size which diverges widely from 40 to 80 μm, and hence there is a problem in the controllability of grain size. Moreover, there is a problem in that it is not suitable for producing ultra-fine powder having a grain size of not higher than 1.0 μm, which meets the needs people have these days.

With all of the above-mentioned conventional technology, it is necessary to use a chloride having a high vapor pressure for producing metallic powder particularly fine powder, and hence the form of raw material is restricted.

The present invention was made in view of the above circumstances, and it is an object of the present invention to provide a process for producing metallic ultra-fine powder, which makes it possible to use a raw material which is spread over a wide range, freely control the grain size of the metallic powder to be produced, and reduce the grain size to be not higher than 1/10 of that of the raw material in the case in which the raw material is a powdery one, at low cost and with high safety.

DISCLOSURE OF INVENTION

The first aspect of the present invention is a process for producing metallic ultra-fine powder comprising jetting a powdery metallic compound into a high temperature reductive airflow generated in a furnace by a burner to heat and reduce said metallic compound, thereby forming spherical metallic ultra-fine powder having a controlled grain size.

The grain size of the above spherical metallic powder may be controlled by adjusting the oxygen ratio of the burner.

The grain size of the above metallic ultra-fine powder can be lowered to be smaller than the grain size of a raw material. The grain size of the above metallic ultra-fine powder can be lowered to be not larger than 1/10 of the grain size of the raw material.

The above high temperature reductive atmosphere (airflow) may be generated using a hydrocarbon type fuel in gaseous or liquid form with oxygen or oxygen-enriched air. The above metallic compound is preferably a substance other than chloride. The grain size of the above metallic ultra-fine powder can be also controlled by way of the temperature in the furnace.

The second aspect of the present invention is a process for producing metallic ultra-fine powder including atomizing a solution of a compound which contains a metallic element of a raw material and puffing it into a furnace in which a high temperature reductive airflow is generated by partially burning a fuel which is supplied from a burner, to heat, decompose and reduce the metallic compound, thereby forming spherical metallic ultra-fine powder having controlled grain size. The above solution may be atomized from the burner into the furnace.

In the above process, the above solution may be an organic solvent, and the solution can be atomized as a fuel for the burner to be partially burned, thereby generating a high temperature reductive atmosphere (airflow) to form spherical metallic ultra-fine powder.

The third aspect of the present invention is metallic ultra-fine powder produced by any of the processes for producing metallic ultra-fine powder as set forth in the above.

The fourth aspect of the present invention is a burner which generates a high temperature reductive airflow from a fuel fluid and oxygen or oxygen-enriched air to reduce a metallic compound, thereby producing metallic ultra-fine powder having a grain size smaller than the grain size of a raw material, including:

a raw material jetting hole for jetting a metallic compound as a raw material in a direction, with a fuel fluid as a carrier gas, plural primary oxygen jetting orifices disposed circularly around a center of the raw material jetting hole, for jetting of oxygen or oxygen-enriched air parallel to said direction of jetting the raw material, and plural secondary oxygen jetting orifices disposed circularly around a center on the raw material jetting hole and outward from the primary oxygen jetting orifices, for jetting oxygen or oxygen-enriched air toward a point on a line extended from the raw material jetting hole and parallel to the direction of jetting of said raw material.

The above raw material jetting hole, primary oxygen jetting orifices, and secondary oxygen jetting orifices have different fluid supply channels, and hence the jetting amount of each fluid can be controlled independently.

In the above burner for producing metallic ultra-fine powder, the above career gas may be air, oxygen, oxygen-enriched air, or an inert gas such as nitrogen. In this case, fuel jetting orifices for supplying a fuel fluid are disposed separately.

The fifth aspect of the present invention is a burner which generates a high temperature reductive airflow from an organic solvent and oxygen or oxygen-enriched air to reduce a metallic compound, thereby producing metallic ultra-fine powder, including:

a raw material atomizing hole for atomizing and jetting a liquid raw material containing a metallic compound dissolved in an organic solvent, plural primary oxygen jetting orifices disposed circularly around a center of said raw material atomizing hole, for jetting oxygen or oxygen-enriched air parallel to a center line of the raw material atomizing hole, and plural secondary oxygen jetting orifices disposed circularly around a center of the raw material atomizing hole and outward from the primary oxygen jetting orifices, for jetting oxygen or oxygen-enriched air toward a point on a line extended from the raw material atomizing hole and parallel to the center line of the raw material atomizing hole.

In the above burner for producing metallic ultra-fine powder, when the liquid raw material contains no organic solvents, it is possible to further dispose plural fuel jetting orifices circularly around a center of the raw material atomizing hole, between the above raw material atomizing hole and the above primary oxygen jetting orifices, for jetting the fuel parallel to the center line of the raw material atomizing hole.

The sixth aspect of the present invention is an apparatus for producing metallic ultra-fine powder including a furnace part for performing heat treatment of a raw material in an oxidation-reduction atmosphere, the burner as set forth in the above fourth aspect or fifth aspect of the present invention, disposed in said furnace part, for jetting a fuel, oxygen or oxygen-enriched air, with a raw material toward said furnace part, a fuel supply system for supplying a fuel to said burner, a raw material supply system for supplying a raw material to said burner, and a cooling gas supply system for supplying a cooling gas to said furnace part.

In the above apparatus for producing metallic ultra-fine powder, the cooling gas supply system further includes a gas supplying apparatus for controlling temperature.

The present invention consists of a burner and a furnace which can generate a highly reductive atmosphere (airflow), and an apparatus which separates the gas generated from the furnace and powder to recover the powder (for example, a bag filter). The burner is directly linked to the furnace and which forms a high temperature reductive atmosphere (flame) within the furnace using a burning-assist gas in an amount which is smaller than the amount which is necessary to perform perfect combustion of a fuel, with a fuel.

In addition, the burner has a function of blowing the powdery metallic compound used as a raw material into a high temperature reductive flame. By this, the raw material powder is efficiently heated in the airflow of a high temperature reductive flame, thereby being reduced at high speed into metallic ultra-fine powder. At this time, the grain size of the metallic ultra-fine powder can be controlled by adjusting the oxygen ratio (i.e. the ratio of amount of the burning-assist gas supplied to the burner to the amount of the burning-assist gas required for completely burning the fuel).

The grain size of the metallic powder generated can be lowered to smaller than the grain size of the raw material by increasing the oxygen ratio, whereas the grain size of the metallic powder generated can be increased to be larger than the grain size of the raw material by decreasing the oxygen ratio.

Furthermore, the present invention is characterized by using a fuel, which contains hydrocarbon, in a gaseous or a liquid form, as a fuel for the burner for forming a high temperature reductive atmosphere (airflow), as well as an oxygen-enriched air having oxygen concentration of 50% or more or pure oxygen as a burning-assist gas.

It is possible to generate hydrogen and carbon monoxide by partially oxidizing a hydrocarbon type fuel, and the heating and reductive reaction can be performed at high speed in the high temperature highly reductive atmosphere (airflow) by using a burning-assist gas.

Moreover, the raw material is characterized by using a metallic compound other than a chloride. Because of this, it becomes possible to produce metallic ultra-fine powder, without generating substances which contain chlorine in exhaust gas, thereby increasing the safeness of the apparatus.

The present invention is a process which performs a treatment using a high temperature reductive atmosphere (airflow) which is formed by a burner without using electric energy, and which makes it possible to decrease energy cost, and to enlarge the apparatus easily, compared to conventional methods using electrically heating and heating from outside such as CVD, thereby increasing productivity.

In accordance with the present invention, it is possible to produce metallic fine powder with high productivity, and low energy cost, corresponding to various kinds of raw materials. Moreover, the present invention excels in safety, without generating harmful chlorine gas. Furthermore, the present invention can be applied to metals such as copper, cobalt, etc., in addition to nickel.

BEST MODE FOR CARRYING OUT THE INVENTION

As an example of the present invention, a process for producing nickel ultra-fine powder from nickel oxide powder will be explained in detail below.

Example

Figure 1:
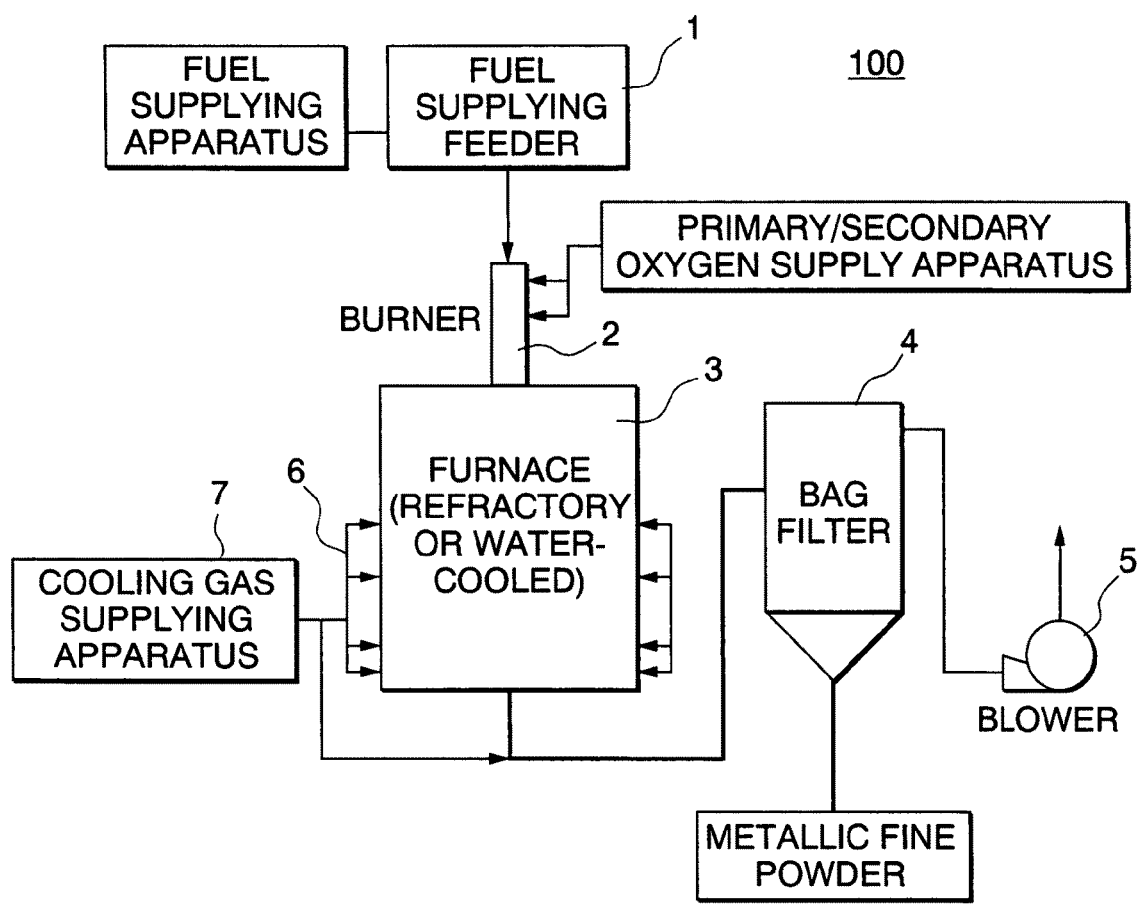
FIG. 1 is a schematic view showing the constitution of an apparatus for producing metallic ultra-fine powder of the present invention.

A schematic diagram which shows the constitution of the apparatus for producing metallic ultra-fine powder of this example is shown in FIG. 1.

The apparatus for producing metallic ultra-fine powder 100 used in this example consists of a feeder 1 for conveying a raw material, a burner 2 and a furnace 3a for forming a high temperature reductive atmosphere (airflow), a bag filter 4b for separating the fine powder and exhaust gas from each other, and a blower 5 for absorbing gas. In the furnace 3, the circumference part of the burner 2 is constituted from refractories and the downstream part behind the middle of the furnace 3 is constructed to be water-cooled furnace wall structure. Moreover, a thermocouple is installed in the refractory wall of the furnace 3, so that the temperature within the furnace wall can be measured.

Moreover, a cooling gas supplying pipe 6 is embedded under the inner wall surface of the furnace 3, so that a cooling gas, for example an inert gas such as nitrogen gas, can be supplied in the tangential direction of the inner wall surface, therethrough. Moreover, a cooling gas supplying apparatus 7 is disposed for this cooling gas supplying pipe 6, and the temperature in the furnace can be controlled by adjusting the flow rate of the cooling gas which is supplied to the cooling gas supplying pipe 6 and measuring the temperature of the portion around the wall surface of the furnace 3. It should be noted that the cooling gas supplying pipe 6 and the cooling gas supplying apparatus 7 can be left out.

The metallic fine particles used as raw material are quantitatively sent out by the feeder 1, and then conveyed by the carrier gas, thereby being supplied to the burner 2. In this example, as the carrier gas, the fuel gas which is burned in the burner 2 is used.

Figure 2A:
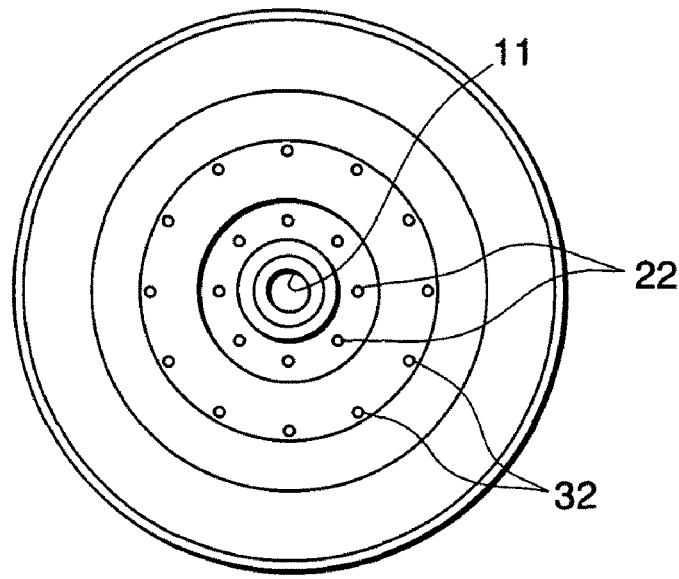
FIG. 2A is a front view of a burner tip part.
Figure 2B:
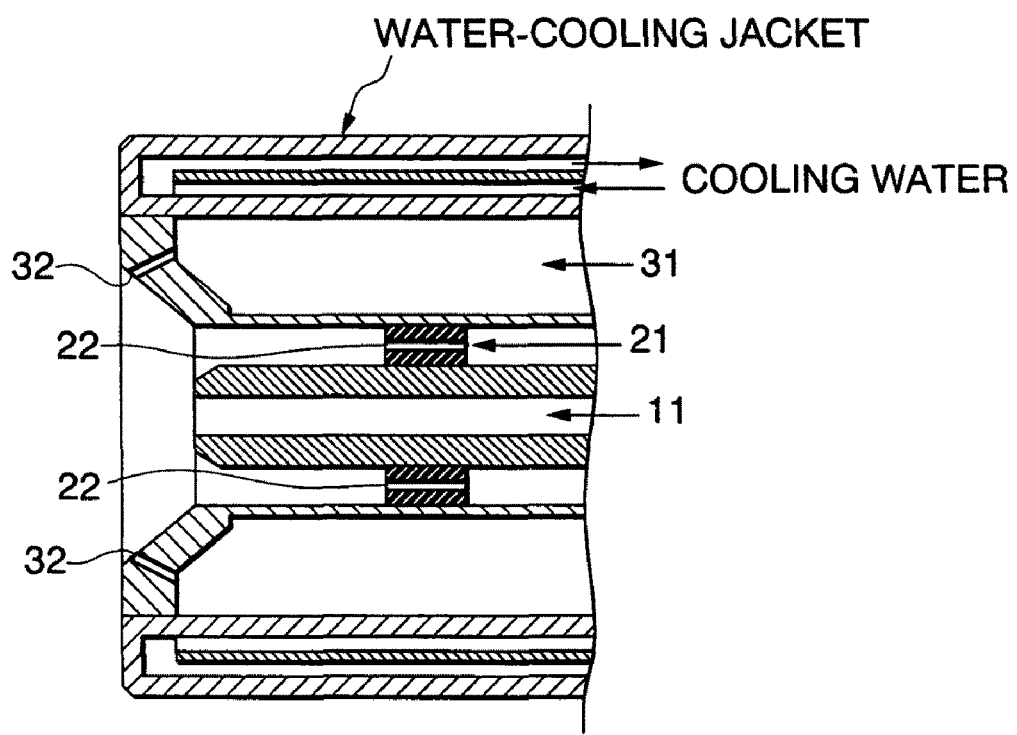
FIG. 2B is a sectional view showing the structure of the burner tip part.

The structure of the tip part 20 of the burner 2 used in this example is shown in FIGS. 2A and 2B. FIG. 2A is a front view of the burner tip part 20, and FIG. 2B is a cross-sectional view showing the structure of the burner tip part 20. As shown in FIGS. 2A and 2B, a raw material powder channel 11 is formed at the center, the primary oxygen channels 21 are formed outside the raw material powder channel 11, and the secondary oxygen channels 31 are formed outside the primary oxygen channels 21. In the raw material powder channel 11, the fuel fluid is supplied as a carrier gas. Therefore, a fuel fluid and raw material powder are jetted from the raw material powder channel 11 as a powdery flow. At the tip of the primary oxygen channel 21, multiple holes 22 are formed, which jet oxygen gas so that the oxygen gas involves the powdery flow and the oxygen gas becomes a swirl flow. At the tip of the secondary oxygen channel 31, multiple holes 32 are formed, which jet the secondary oxygen.

In this example, although fuel gas is used as a carrier gas for powders, in the case in which dedicated channels and dedicated jetting orifices are prepared for the fuel gas, powder may be conveyed by another gas such as air. Moreover, in this example, although the primary oxygen and the secondary oxygen are jetted through multiple holes, another way can be used as long as it can make the gas jet so as to involve the fuel gas and the raw material powdery flow, and one having a slit-like shape may be used.

Moreover, in this example, although the raw material powder channel 11 is constituted from one hole, it is also effective to design so that the raw material powder is jetted from plural holes (multiple holes). Moreover, in this example, the primary oxygen is jetted as a swirl flow, and the secondary oxygen is jetted as an inclined flow (inclined straight flow). The length of flame which is formed immediately after the burner can be controlled by suitably adjusting the flow rates of the fuel, the primary oxygen, and the secondary oxygen. By jetting the raw material into this flame, the raw material can be thermally treated and then cooled in the furnace, thereby being pulverized.

By adjusting the flow rates of the fuel, the primary oxygen, and the secondary oxygen, the jetting rate of the raw material, and the flow rate of the coolant gas which flows into the furnace, the length of flame and the time for which the raw material is in contact with the flame change, thereby changing the grain size of the fine powder finally obtained.

It should be noted that the way of jetting is not particularly limited, and it is possible to select proper flow and combine, based on the way of jetting the powder and the fuel gas.

In this example, two routes consisting of the primary oxygen channel 21 and the secondary oxygen channel 31 are formed as channels for burning-assist gas. If plural channels are formed, then the length of flame can be changed by changing the ratio therebetween, and hence it becomes an effective means for controlling the above grain size.

Experimental conditions, such as flow rate of a fuel fluid (LPG), flow rate of oxygen, flow rate ratio between the primary oxygen and the secondary oxygen, oxygen ratio, and LPG raw material supplying amount, are shown in Table 1.

TABLE 1

| LPG flow rate (Nm³/h) | | 10 |
|---|---|---|
| Oxygen flow rate (Nm³/h) | Total | 30 to 48 |
| | Flow rate ratio between the primary oxygen and the secondary oxygen | 0.25 to 4 |
| Oxygen ratio (—) | | 0.4 to 0.95 |
| Raw material powder supply rate (Kg/h) | | 10-50 |

It should be noted that example was performed under conditions that as the raw material powder a pure nickel oxide (nickel purity of 78.6%) having a grain size of approximately 1 μm was used, and the temperature of the circumference of the burner 2 was maintained at 1500 to 1600° C. (not lower than the melting point of metallic nickel).

Figure 3:
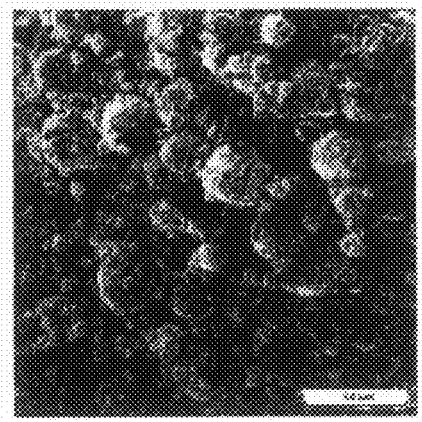
FIG. 3 is an SIM image of nickel ultra-fine powder obtained by setting the oxygen ratio to be 0.6.

An SIM (Scanning Ion Microscope) image of the external appearance of the powder as the product (nickel ultra-fine powder) under the condition that the oxygen ratio was 0.6 is shown in FIG. 3. In this case, many spherical grains having a grain size of approximately 4 μm were observed.

Figure 4:
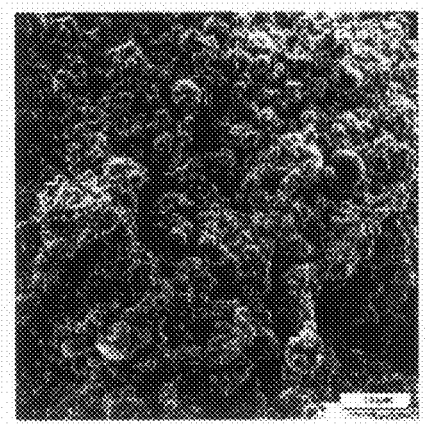
FIG. 4 is an SIM image of nickel ultra-fine powder obtained by setting the oxygen ratio to be 0.8.

An SIM image of the product under the condition that the oxygen ratio was 0.8 is shown in FIG. 4. At the oxygen ratio of 0.8, many spherical grains having a grain size of approximately 0.2 μm were observed.

Figure 5:
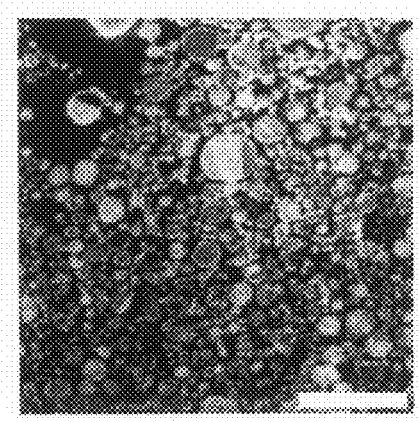
FIG. 5 is an SIM image (inclined by 60°) of a cross-section of a product (nickel ultra-fine powder) under the condition of an oxygen ratio of 0.8.

An SIM image (inclined by 60°) of the cross-section of the product (nickel ultra-fine powder) under the condition that the oxygen ratio was 0.8 is shown in FIG. 5. Each particle of the spherical ultra-fine powder having a grain size of not larger than 0.2 μm was physically isolated, and the grains which were joined were very few, and hence this spherical ultra-fine powder was usable as ultra-fine powder. It should be noted that the results of chemical analysis performed on the resultant ultra-fine powders which was obtained under the conditions of oxygen ratio of 0.6 and oxygen ratio of 0.8, respectively, revealed that the reduction percentage was not less than 99% in both cases.

Figure 6:
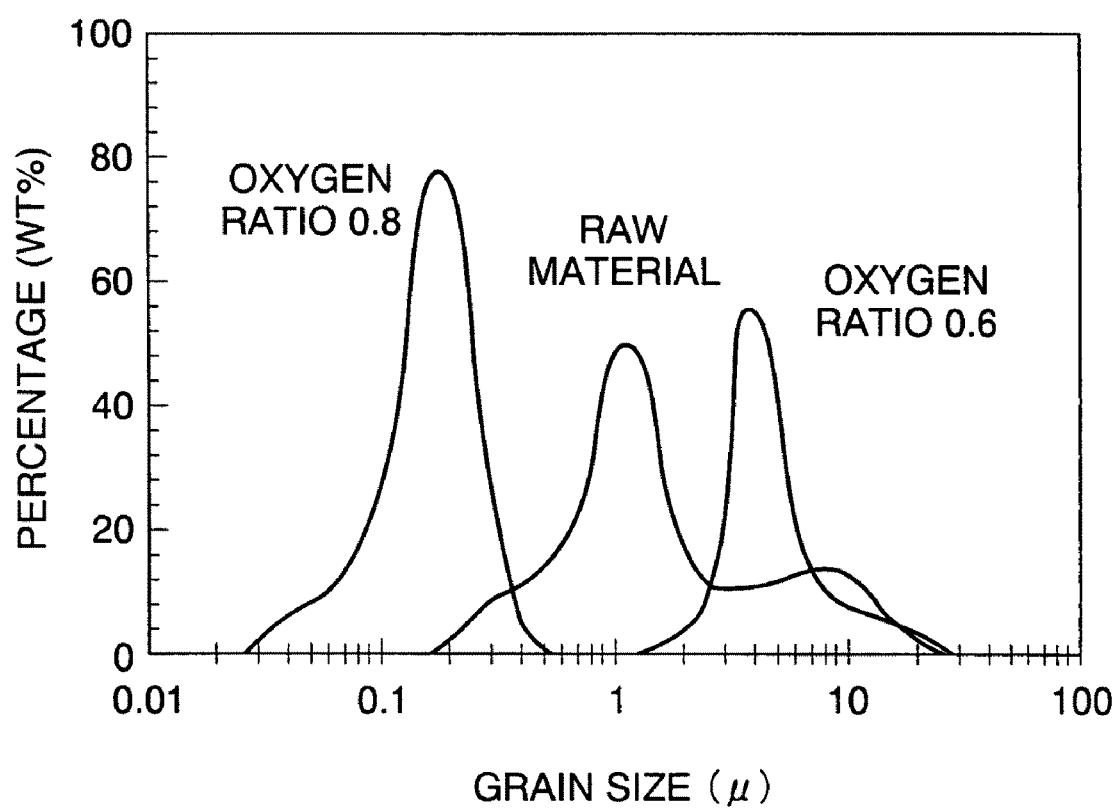
FIG. 6 is the measurement result of the grain size distribution of nickel oxide and nickel ultra-fine powder.

Grain-size-distribution measurement (micro track: a laser diffracting and scattering method) was performed on the raw material powders and the product. The result is shown in FIG. 6.

The grain size distribution of the raw material powder has a peak at approximately 1 μm, whereas the grain-size-distribution of the product has a peak at approximately 4 μm, in the case in which the oxygen ratio is 0.6, revealing that it is larger than the grain size of the raw material powder. On the other hand, in the case in which the oxygen ratio is 0.8, it shows a distribution which has a peak at approximately 0.15 μm, and this reveals that grain size could be controlled by changing the oxygen ratio.

It should be noted that in this example, although nickel oxide was used as the raw material, the invention is applicable to other metallic compounds, such as nickel hydroxide.

Example 2

An experimentation of forming spherical fine powder of metallic nickel was performed, using powdery nickel oxide and nickel hydroxide as raw materials, the burner tip part 20 having the shape shown in FIGS. 2A and 2B in the apparatus for producing metallic ultra-fine powder shown in FIG. 1, while changing kind, supply rate, etc., of the fuel and burning-assist gas. The conditions of experimentation are shown in Table 2.

It was confirmed that spherical ultra-fine powder of metallic nickel could be formed within the range of the experimental conditions shown in Table 2. Moreover, it is revealed that the grain size can be controlled by changing the oxygen ratio in the furnace, the primary/the secondary oxygen ratio, the oxygen concentration in the burning-assist gas, the ratio of the fuel to the raw material, the jetting rate of the gaseous mixture of the raw material and the fuel, the jetting rate of oxygen, the swirling strength of the primary oxygen, the temperature of atmosphere in the furnace, etc.

TABLE 2

| Raw material | Kind (average grain size) | Nickel oxide (0.66 μm) Nickel hydroxide (5 or 10 μm) | |
|---|---|---|---|
| | Supply rate (kg/h) | 3 to 20 | |
| Fuel | Kind | LPG | LNG |
| | Supply rate (Nm³/h) | 1-20 | 2.3-45.9 |
| Burning-assist gas | Kind | Pure oxygen, Oxygen-enriched air | |
| | Supply rate* (Nm³/h) | 2.0-95.0 (LPG) 1.8-87.2 (LNG) | |
| | Primary/secondary oxygen ratio (%) | 10-90 | |
| | Oxygen ratio *2 (−) | 0.4-0.95 | |
| Gas for controlling the temperature in the furnace | Kind | Nitrogen | |
| | Supply rate (Nm³/h) | 0-500 | |

*Supply rate of the burning-assist gas: based on the flow rate of pure oxygen.
*2 Oxygen ratio: the ratio of the amount of oxygen contained in the supplied burning-assist gas to the amount of oxygen required for burning a fuel completely.

Figure 7A:
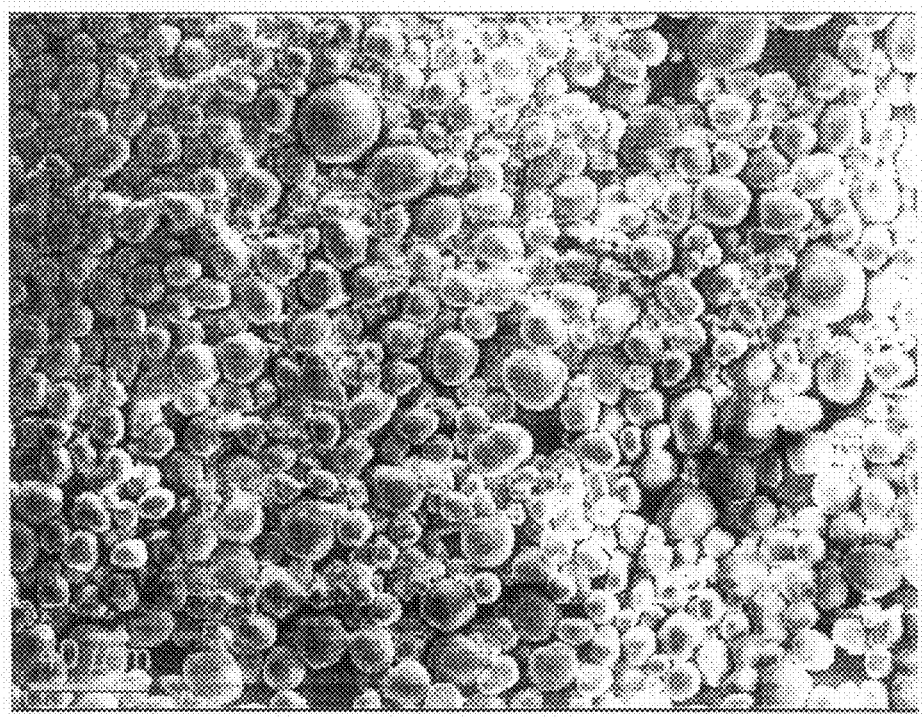
FIG. 7A is an SEM image of nickel oxide as a raw material.
Figure 7B:
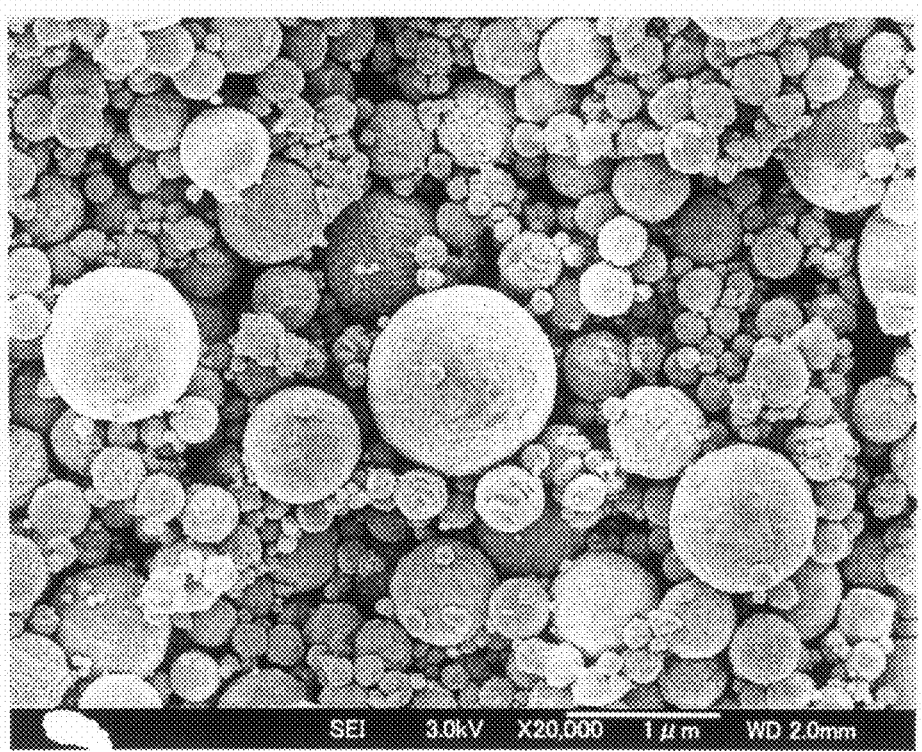
FIG. 7B is an SEM image of generated spherical fine powder.

An example of a scanning electron microscope photograph (SEM (Scanning Electron Microscope) picture) of the spherical fine powder obtained using nickel hydroxide having an average grain size of 10 μm as a raw material is shown. FIG. 7A is an SEM image of nickel hydroxide as a raw material, and FIG. 7B is an SEM image of the produced spherical fine powders. Moreover, as a result of analyzing using micro track, it revealed that spherical fine powder having an average grain size of 0.4 μm were obtained.

Example 3

The influence on the grain size of the spherical fine powder which is given by the temperature in the furnace is shown. In the apparatus for producing metallic ultra-fine powder shown in FIG. 1, the temperature in the furnace was controlled so as to be in the range of 200 to 1600° C., by changing the flow rate of nitrogen gas as a gas for controlling the temperature in the furnace.

Figure 8A:
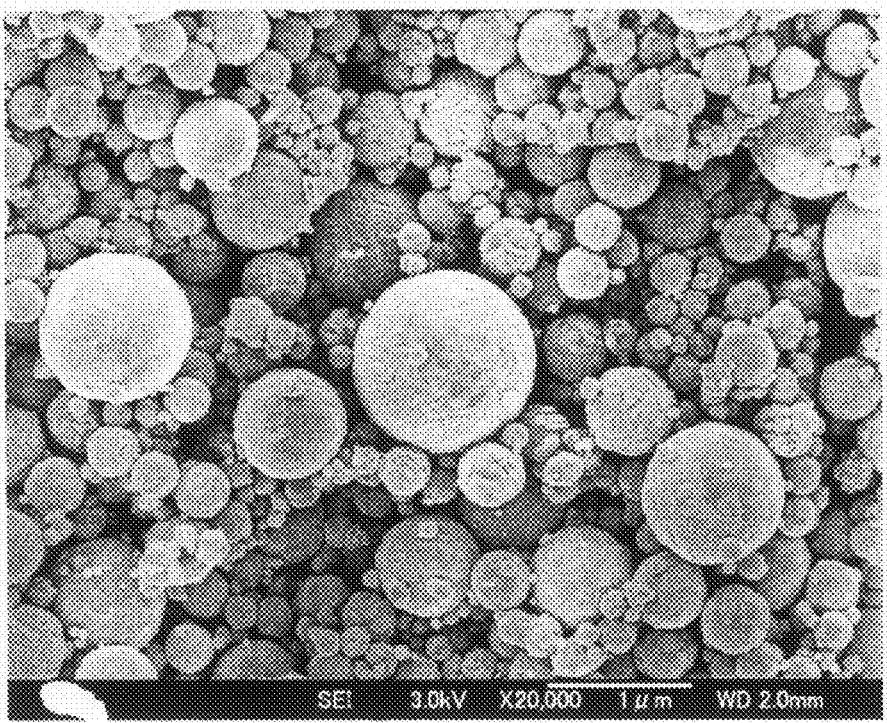
FIG. 8A is an SEM image of spherical fine powders obtained in the case in which nitrogen gas is not supplied into the furnace.
Figure 8B:
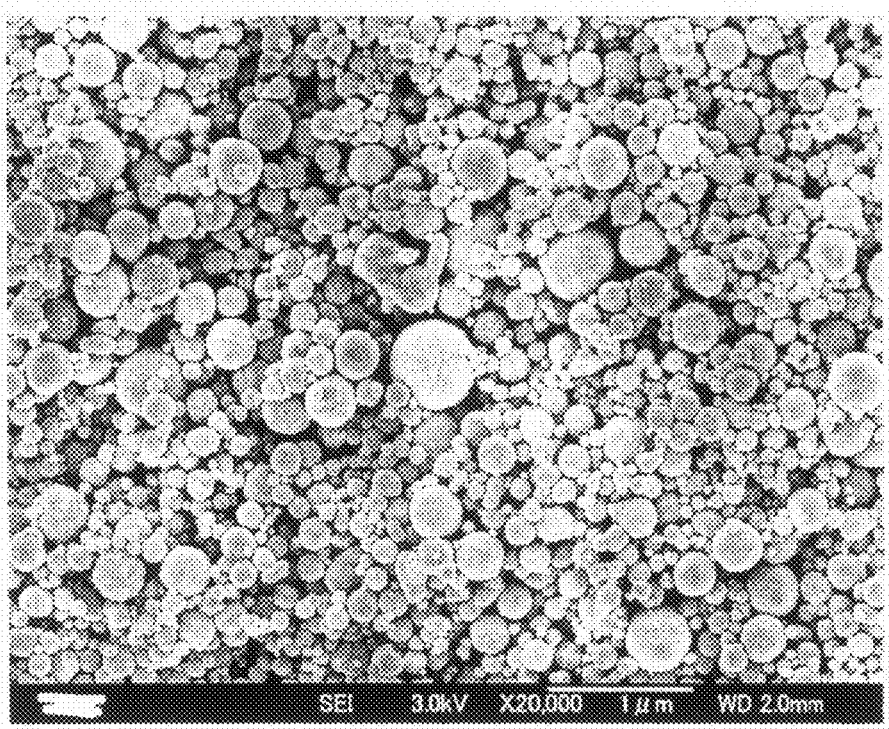
FIG. 8B is an SEM image of spherical fine powders obtained in the case in which nitrogen gas is supplied into the furnace.

When nitrogen gas was not supplied, the temperature in the furnace became approximately 1600° C., and spherical fine powder having an average grain size of 0.4 μm was obtained. When nitrogen gas was supplied at a flow rate of 288 Nm³/h, the temperature in the furnace decreased to approximately 500° C., and spherical fine powder having an average grain size of 0.2 μm was obtained. An SEM image of the spherical fine powder obtained in the case in which nitrogen gas was not supplied is shown in FIG. 8A, and an SEM image of the spherical fine powder obtained in the case in which nitrogen gas was supplied is shown in FIG. 8B.

Example 4

Figure 9:
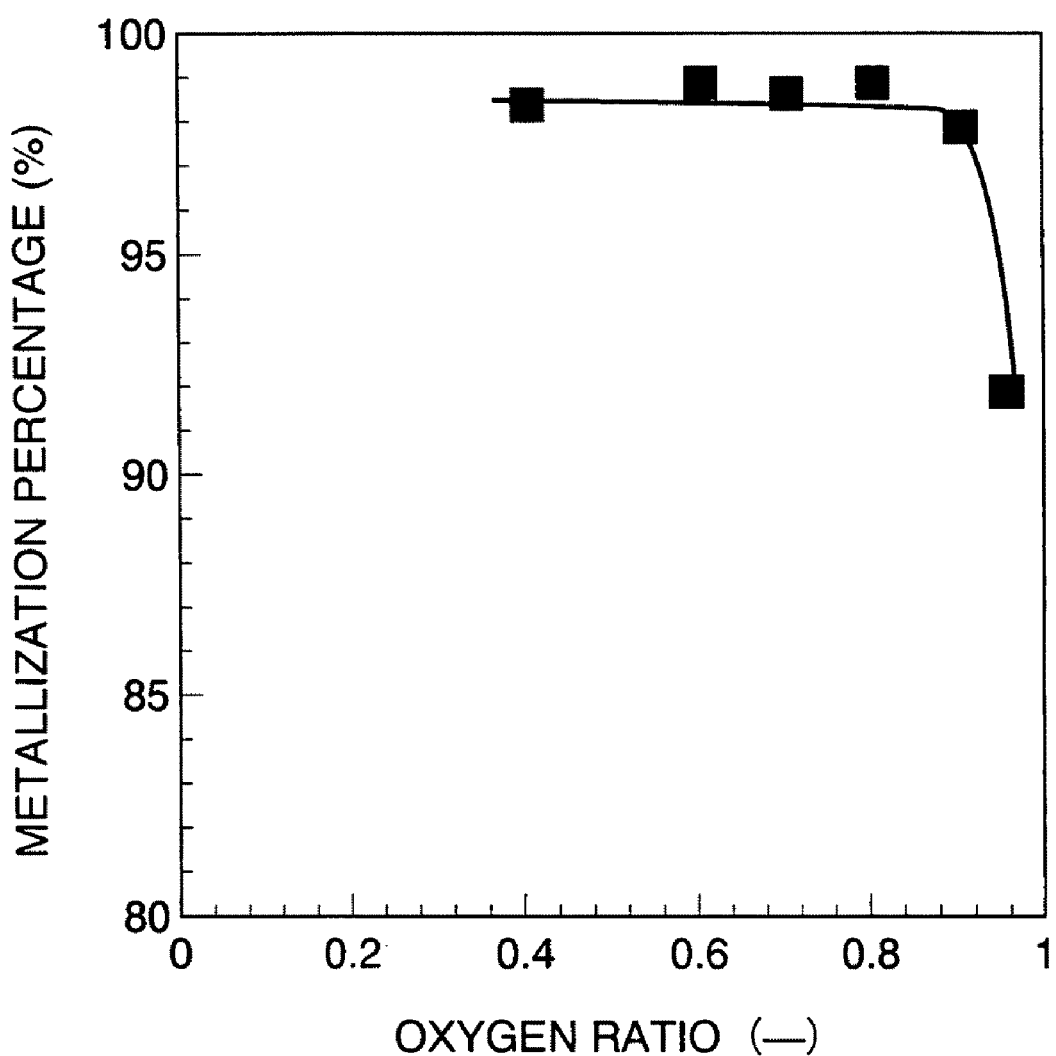
FIG. 9 is a graph showing the relationship between the oxygen ratio of the burner and the metallization percentage.

The relationship between the oxygen ratio of the burner (i.e. the ratio of supplied quantity of oxygen to the quantity of oxygen which is equivalent to the quantity required for burning a fuel perfectly) and the metallization percentage was investigated, using nickel oxide and nickel hydroxide as raw materials. The relationship between the oxygen ratio of the burner and the metallization percentage is shown in FIG. 9. It was revealed that if the oxygen ratio is not more than 0.9, then a high metallization percentage of not less than 98% could be obtained.

Moreover, although a hydrocarbon type fuel was used as a fuel in this example, in the case in which it will become a problem for soot to remain in the produced fine powder, the problem can be easily resolved by using hydrogen as a fuel.

Example 5

An experiment for obtaining ultra-fine grains of metallic nickel was performed, using an aqueous solution raw material in which nickel nitrate was dissolved in water, an organic solution of raw material in which nickel nitrate was dissolved in an organic solvent such as methanol, etc.

Figure 10A:
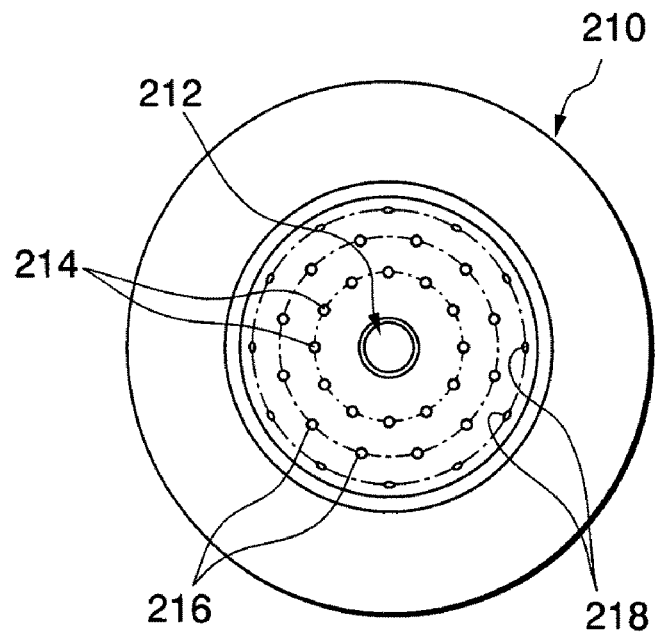
FIG. 10A is a front view of the burner tip part in the case of using an aqueous solution raw material.
Figure 10B:
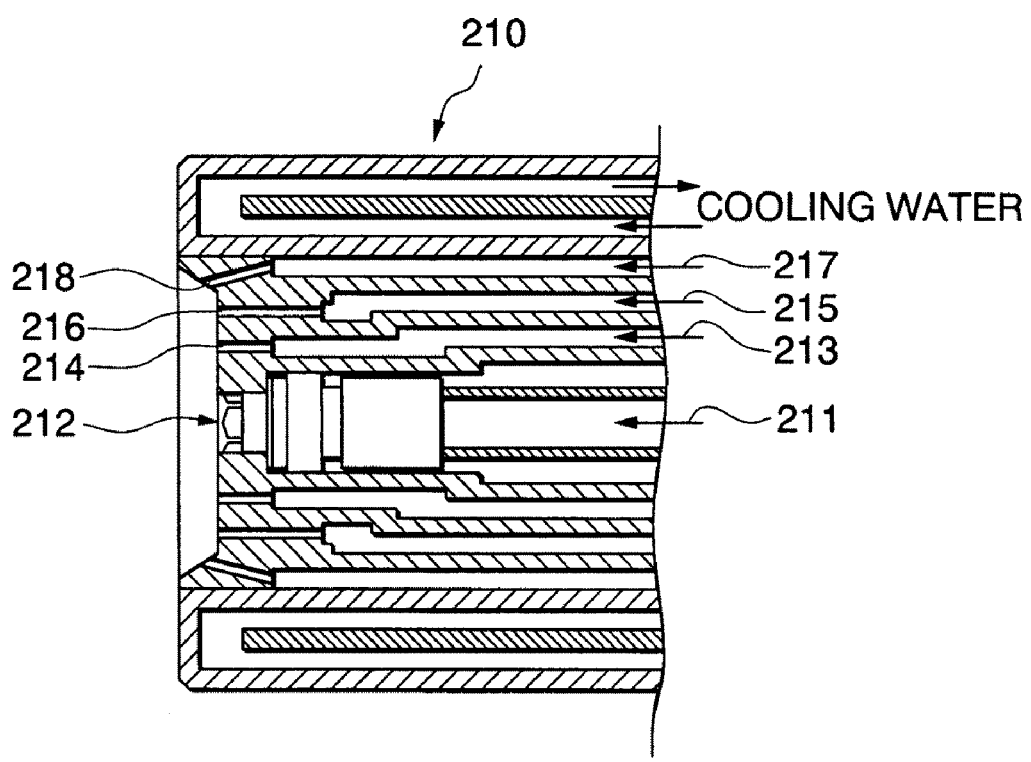
FIG. 10B is a sectional view showing the structure of the burner tip part in the case of using an aqueous solution raw material.
Figure 11A:
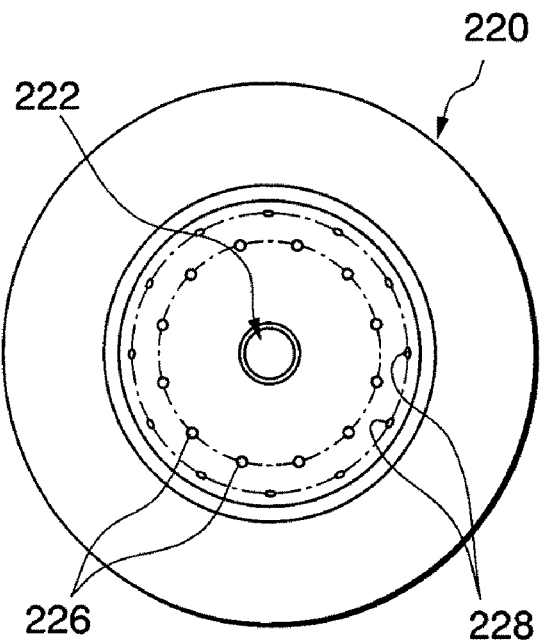
FIG. 11A is a front view of the burner tip part in the case of using an organic solvent raw material.
Figure 11B:
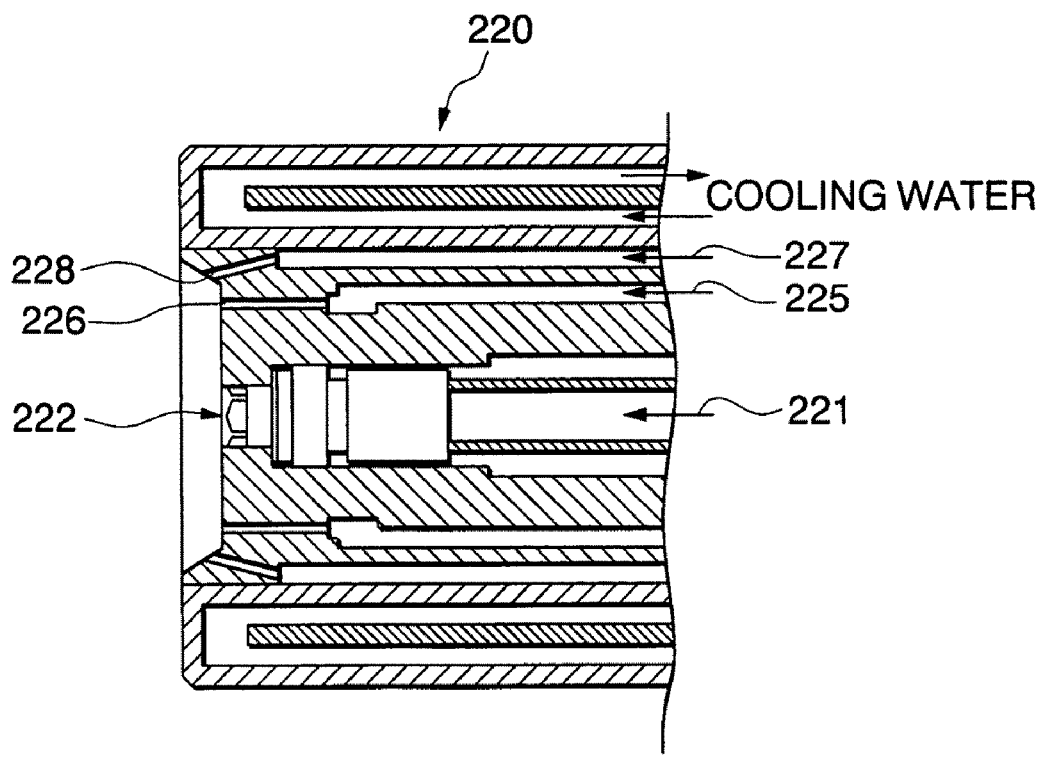
FIG. 11B is a sectional view showing the structure of the burner tip part in the case of using an organic solvent raw material.

Examples of the structure of the burner tip part used when using liquid raw materials, such as an aqueous solution raw material or an organic solution of raw material, are shown in FIGS. 10A, 10B, 11A and 11B. FIG. 10A is a front view of the tip part 210 of the burner 2 in the case of using an aqueous solution of raw material, and FIG. 10B is a cross-sectional view showing the structure of this burner tip part 210. FIG. 11A shows a front view of the tip part 220 of the burner 2 in the case of using an organic solution of raw material, and FIG. 11B shows a cross-sectional view showing the structure of the burner tip part 220.

In the burner tip part 210 shown in FIGS. 10A and 10B, the raw material channel 211 is formed at the center, the fuel channel 213 (in this example, for gaseous fuel) is formed outside the raw material channel 211, the primary oxygen channel 215 which is a channel for flow of the primary oxygen is formed further outside the fuel channel 213, and the secondary oxygen channel 217 which is a channel for flow of the secondary oxygen is formed outside the primary oxygen channel 215. At the end of the raw material channel 211, an atomizing hole 212 is formed, and an aqueous solution of raw material is atomized like a mist and flows therefrom. At the end of the raw material channel 213, a fuel jetting orifice 214 is formed, and at the end of the primary oxygen channel 215, the primary oxygen jetting orifice 216 is formed. As shown in FIG. 10B, the raw material channel 211, the fuel channel 213, and the primary oxygen channel 215 are formed approximately parallel to the center line of the burner tip part 210 (alternating long and short dash line in FIG. 10B, which is drawn along the direction of supply of the raw material), and an aqueous solution of raw material, fuel, and the primary oxygen are jetted in the direction along the center line of the burner tip part 210.

The secondary oxygen jetting orifice 218 formed at the end of the secondary oxygen channel 217 is aslant formed to the center line of the burner tip part 210, and the plural secondary oxygen jetting orifices 218 are formed inclined to the direction toward a point on a line extended from the center line of the burner tip part 210.

In the burner shown in FIGS. 11A and 11B, fuel channels are not formed, the raw material channel 221 is formed at the center, the primary oxygen channel 225 which is a channel for flow of the primary oxygen is formed outside the raw material channel 221, and the secondary oxygen channel 227 which is a channel for flow of the secondary oxygen is formed outside the primary oxygen channel 225. This is because, in the case of using an organic solution of raw material, the organic solvent can be utilized as a fuel itself.

As shown in FIG. 11B, the raw material channel 221 and the primary oxygen channel 225 are formed approximately parallel to the center line of the burner tip part 220 (alternately long and short dash line in FIG. 11B, which is drawn along the direction of supply of a raw material), and an organic solvent raw material and the primary oxygen are jetted in the direction along the center line of the burner tip part 220.

On the other hand, the secondary oxygen jetting orifice 228 formed at the end of the secondary oxygen channel 227 is aslant formed to the center line of the burner tip part 220, and the plural secondary oxygen jetting orifices 228 are formed inclined to the direction toward a point on a line extended from the center line of the burner tip part 220.

Although the above liquid raw material is atomized into a mist by compressing atomization, it is also possible to perform atomization by double fluid atomization using compressed air or steam or an ultrasonic nebulizer, instead of using compressing atomization.

In the case of an aqueous solution a raw material, by the flame which is formed outer periphery thereof, whereas in the case of an organic solvent raw material, by the flame derived from the raw material fluid itself, the atomized raw material is thermally treated rapidly. Although the way of jetting a burning-assist gas (in this case, oxygen) and a fuel is almost the same as in the case of using powdery raw material above, it is possible to adopt various jetting forms in order to form a flame which is capable of involving the raw material.

An experiment was performed, using two kinds of burners each consisting of the apparatus shown in FIG. 1, and one of the burner tip parts 210 and 220, having the shapes shown in FIGS. 10A and 10B, and FIGS. 11A and 11B, respectively. The conditions for the experiment are shown in Table 3.

TABLE 3

| | Kind | Aqueous solution of raw material | Organic solution of raw material |
|---|---|---|---|
| Raw material | | Nickel nitrate *1 + water | Nickel nitrate *1 + ethanol |
| | Solution temperature | Standard temperature | Standard temperature |
| | Nickel concentration *2 (%) | 2 to 9 | 2 to 7 |
| | Supply rate (Nm³/h) | 5 to 20 | 5 to 20 |
| Fuel | Kind | LPG          LNG | — |
| | Supply rate (Nm³/h) | 1 to 20     2.3 to 45.9 | |
| Burning-assist gas | Kind | Pure oxygen, oxygen enriched air | |
| | Supply rate *3 (Nm³/h) | 2 to 95 (LPG) 1.8 to 87.2 (LNG) | 1.9 to 18 |
| | Primary/secondary oxygen ratio (%) | 10 to 90 | |
| | Oxygen ratio *4 (—) | 0.4 to 0.95 | |
| Gas for controlling the temperature in the furnace | Kind | Nitrogen | |
| | Supply rate (Nm³/h) | 0 to 500 | |

*1 Nickel nitrate: hexa hydrates
*2 Nickel concentration: concentration of nickel element contained in each solution.
*3 Burning-assist gas supply rate: based on oxygen flow rate.
*4 Oxygen ratio: Ratio of the amount of oxygen contained in the supplied burning-assist gas to the amount of oxygen required for burning a fuel perfectly.

Figure 12:
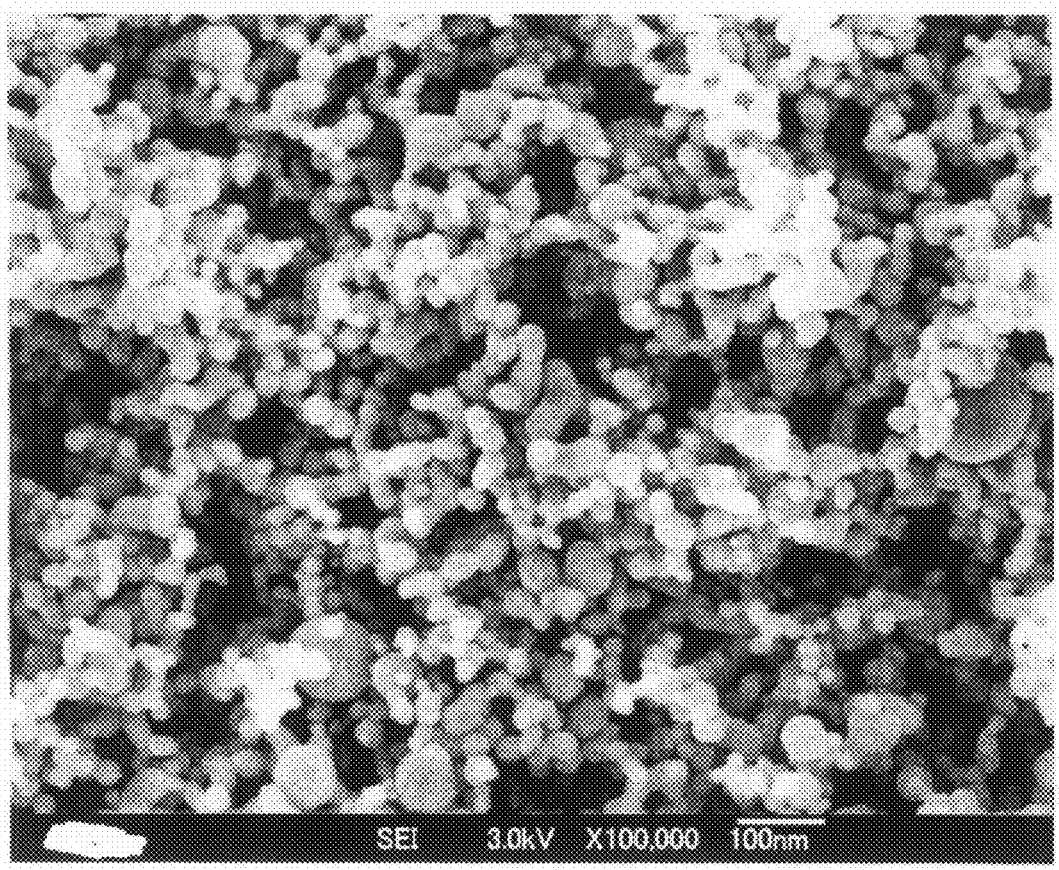
FIG. 12 is an SEM image of metallic ultra-fine powder obtained when a liquid raw material is used.

An SEM image of the formed metallic ultra-fine powder is shown in FIG. 12. When a liquid raw material was used, the size of grain obtained was very small compared to that of the solid raw material, and it was possible to obtain many nanoscale spherical grains. Moreover, the metallization percentage of this metallic ultra-fine powder was approximately 97%.

Also when using a liquid raw material, as described in Example 3, grain size can be controlled freely by controlling the temperature in the furnace. Furthermore, nickel element concentration and the diameter of atomized grain can also serve as a grain-size-controlling factor.

Moreover, it is also possible to increase nickel concentration in a solution to increase productivity by heating an aqueous solution raw material and an organic solvent raw material. Moreover, the solute is not limited to nitrate, and what is required for the solute is that it be soluble in water or an organic solvent, and contain the target metallic element.

Moreover, it is also possible to use an organic metallic compound which contains the target metallic element. Furthermore, the target metallic elements are not restricted to nickel, and it is possible to include any appropriate metal such as copper, cobalt, etc.

While preferred embodiments of the present invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The present invention can be applied to the production of metallic ultra-fine powder, and is capable of using a wide spread raw material, and controlling freely the grain size of metallic powder to be formed, with low cost and excellent safety.

INDUSTRIAL APPLICABILITY

The present invention is applicable to a process for producing metallic ultra-fine powder, for obtaining metallic ultra-fine powder having controlled grain size from a metallic compound in a high temperature reductive atmosphere using a burner, a burner for producing metallic ultra-fine powder, and an apparatus for producing metallic ultra-fine powder.

The invention claimed is:

1. A process for producing metallic ultra-fine powder comprising
jetting a powdery metallic compound into a high temperature reductive airflow, which is generated in a furnace by partially burning a fuel which is supplied from a burner with a burning-assist gas, to heat and reduce said metallic compound, thereby forming spherical metallic ultra-fine powder having a controlled particle size, wherein
the particle size of said spherical metallic ultra-fine powder is controlled by adjusting an oxygen ratio of the burner, and
the particle size of said metallic ultra-fine powder is lowered to be not larger than $1/10$ of the particle size of said metallic compound.

2. The process for producing metallic ultra-fine powder as set forth in claim 1, wherein said high temperature reductive airflow is generated using a gaseous or a liquid hydrocarbon fuel with oxygen or oxygen-enriched air.

3. The process for producing metallic ultra-fine powder as set forth in claim 1, wherein said metallic compound is a substance other than a chloride.

4. The process for producing metallic ultra-fine powder as set forth in claim 1, wherein the particle size of said metallic ultra-fine powder is controlled by the temperature in said furnace.

5. A process for producing metallic ultra-fine powder comprising
atomizing a solution of a compound which contains a metallic element of a raw material and providing it into a furnace in which a high temperature reductive airflow is generated by partially burning a fuel which is supplied from a burner with a burning-assist gas, to heat, decompose and reduce said metallic compound, thereby forming spherical metallic ultra-fine powder having a controlled particle size, wherein
the particle size of said spherical metallic ultra-fine powder is controlled by adjusting an oxygen ratio of the burner, and
the particle size of said metallic ultra-fine powder is lowered to be not larger than $1/10$ of the particle size of said metallic compound.

6. The process for producing metallic ultra-fine powder as set forth in claim 5, wherein said solution is atomized by and supplied from a burner into said furnace.

7. The process for producing metallic ultra-fine powder as set forth in claim 5, wherein said solution has an organic solvent, and said solution is atomized as the fuel for said burner to be partially burned, thereby generating a high temperature reductive airflow to form spherical metallic ultra-fine powder.

* * * * *